(12) United States Patent
Kopparthi

(10) Patent No.: US 11,010,116 B1
(45) Date of Patent: May 18, 2021

(54) PRINT JOB BACKUP

(71) Applicant: Hewlett-Packard Development Company, L.P., Spring, TX (US)

(72) Inventor: Ashok Vardhan Kopparthi, Bangalore (IN)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/636,686

(22) PCT Filed: Jul. 13, 2018

(86) PCT No.: PCT/US2018/041963
§ 371 (c)(1),
(2) Date: Feb. 5, 2020

(87) PCT Pub. No.: WO2019/040198
PCT Pub. Date: Feb. 28, 2019

(51) Int. Cl.
*G06F 3/12* (2006.01)
*G06K 15/00* (2006.01)

(52) U.S. Cl.
CPC .......... *G06F 3/1263* (2013.01); *G06F 3/1258* (2013.01); *G06F 3/1259* (2013.01)

(58) Field of Classification Search
None
See application file for complete search history.

(56) References Cited

U.S. PATENT DOCUMENTS

| | | |
|---|---|---|
| 4,279,523 A | 7/1981 | Ringle |
| 5,791,790 A | 8/1998 | Bender et al. |
| 6,996,746 B2 * | 2/2006 | Shukla ............... G06F 1/30 714/24 |
| 7,154,619 B1 | 12/2006 | Yoshida et al. |
| 7,345,777 B2 * | 3/2008 | Lester ............... G06K 15/02 358/1.14 |
| 2005/0128512 A1 | 6/2005 | Kurotsu |
| 2005/0141023 A1 * | 6/2005 | Yagita ............... G06F 3/1212 358/1.15 |
| 2012/0150916 A1 | 6/2012 | Anilson |
| 2012/0162696 A1 | 6/2012 | Noecker, Jr. |
| 2012/0229852 A1 | 9/2012 | Kubo et al. |
| 2013/0013946 A1 | 1/2013 | Hamada |

OTHER PUBLICATIONS

CompTIA A+ Certification All-in-One Desk Reference for Dummies ~ https://books.google.co.in/books ~ Jul. 2017 ~ 1 page.

* cited by examiner

*Primary Examiner* — Dov Popovici
(74) *Attorney, Agent, or Firm* — HP Inc. Patent Department

(57) ABSTRACT

In some implementations, a print device may possess a processor, print device memory, and a print queue manager. The print queue manager is to add a print job to a print queue having a plurality of print jobs to be printed. The print job corresponds to a print request received from a user for printing a digital document. The print queue manager further determines occurrence of a first trigger event for creating a print job backup. The first trigger event includes a print job deferment input. The print queue manager may further obtain print data corresponding to an unprocessed print job identified for print job backup based on the occurrence of the first trigger event and save the print data corresponding to the identified unprocessed print job in the print device memory to create the print job backup.

15 Claims, 5 Drawing Sheets

PRINT JOB BACKUP

BACKGROUND

Print devices are peripherals commonly used in home and office environments for obtaining printed copies of digital documents having print data, such as text or images. To enable a user to use the print device, a printer interface may be provided either in the form of a graphical user interface on the print device or as a web interface on a user device of the user. For instance, the user may use the graphical user interface to provide commands for preforming multiple jobs, such as printing, copying, and scanning a digital document.

BRIEF DESCRIPTION OF DRAWINGS

The detailed description is described with reference to the accompanying figures. It should be noted that the description and figures are merely examples of the present subject matter and are not meant to represent the subject matter itself.

Figure 1:
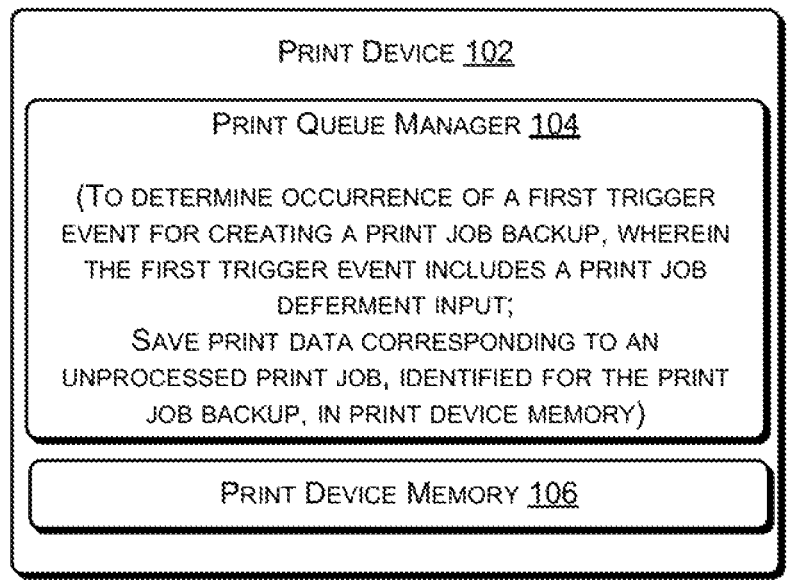
FIG. 1 illustrates a print device, according to an example implementation of the present subject matter.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Print devices are commonly used for printing digital documents on a print media to obtain printed copies of the digital documents. To obtain the printed copies, the user may use a graphical user interface on a computing device to provide print commands to a print device. Upon receiving a command for performing a print job, the print interface on the print device may add the print job to a print queue. The print queue includes a list of print jobs held in a volatile memory, such as a cache memory of the print device, and indicates the current status of all active and pending print jobs.

The print queue is typically processed sequentially with the print jobs getting completed in a sequential order. With recent developments, a user may control print queue operations, such as pausing, resuming, cancelling, and prioritizing print jobs, and changing an order of the print jobs in the print queue. As the print jobs are listed in the print queue, power failure or an event requiring restart of the print device may result in deletion of the print jobs owing to which the users may have to reinitiate the print job. Additionally, if a user wants to postpone a print job, the user may have to either delete the print job from the print queue or pause the printing, causing all the print jobs in the print queue to stop. One conventional technique describes automatically saving all print jobs in a non-volatile memory space of the print device to save print data against such events. However, saving all the print jobs in the memory space may lead to a high consumption of resources, such as memory space and processing units of the print device.

Example implementations for a print device and a print interface manager are described. In said implementations, the print device allows a user of the print device to manually select unprocessed print jobs from a print queue and create a backup of the unprocessed print jobs in a nonvolatile disk, such as print device memory. Once the user requests for printing the unprocessed print jobs saved in the print device memory, the print device may obtain the unprocessed print jobs from the print device memory and complete the unprocessed print jobs. The present subject matter thus facilitates backup creation of print jobs based on user instructions.

In an example implementation, a print queue manager of the print device may create a print queue having a plurality of print jobs such that each print job corresponds to a print request received from a user for printing a digital document. The print queue manager may monitor the print queue to print each print job in the sequential order of their addition to the print queue. While the print jobs are queued in the print queue, the user may access a print interface of the print device for managing the print queue. For instance, the user may access the print queue to identify an unprocessed print job for which the user intends to defer the print to a later point in time. Upon receiving a first user input indicating the unprocessed print job, the print queue manager may determine that a first trigger event has occurred.

The print queue manager may accordingly obtain print data corresponding to the unprocessed print job identified for print job backup. The print queue manager may subsequently save the print data corresponding to the identified unprocessed print job in the print device memory to create the print job backup. Further, on occurrence of a second trigger event, such as receiving user instructions to print the identified unprocessed print job, the print queue manager may obtain the identified unprocessed print job from the print device memory. The print queue manager may further add the identified unprocessed print job to the print queue for printing and delete the identified unprocessed print job from the print device memory.

The present subject matter thus facilitates selective print job backup creation upon occurrence of a specified first trigger event, such as print job deferment input or threshold time exceeded input. Selectively creating print job backup facilitates in optimizing use of system resources, such as the print device memory and processing units of the print device. Further, allowing a user to manually select the print jobs to be saved in the print device memory, facilitates a user in managing the print queue and deferring the selective print jobs for a later point of time. Saving the deferred print job in the print device memory helps in preventing the print jobs from getting erased in a situation where the print device is switched off, for example, due to a probable power cut or an error requiring the user to switch off the print device. Further, saving the deferred print job in the print device memory helps the user in avoiding the cumbersome task of reselecting the digital document in a user device for printing at a later point of time.

The present subject matter is further described with reference to FIGS. 1 to 5. It should be noted that the description and figures merely illustrate principles of the present subject matter. Various arrangements may be devised that, although not explicitly described or shown herein, encompass the principles of the present subject matter. Moreover, all statements herein reciting principles, aspects, and examples of the present subject matter, as well as specific examples thereof, are intended to encompass equivalents thereof.

FIG. 1 illustrates a print device 102 for creating print job backup, according to an example implementation of the present subject matter. Examples of the print device 102 include, but are not limited to, a printer, a multifunction printer, a home printer, and an office printer.

In one implementation, the print device 102 includes a print queue manager 104 to manage a print queue having a plurality of print jobs to be printed in a sequential order. Upon receiving a print request from a user for printing a digital document, the print queue manager 104 may add a print job to the print queue. The print queue manager 104 may subsequently monitor the print queue to determine occurrence of a first trigger event for creating a print job backup. In one example, the first trigger event includes a print job deferment input indicating a user's intent to defer the printing of a specific print job to a later point in time.

The print queue manager 104 may accordingly obtain print data corresponding to the identified unprocessed print job for print job backup based on the occurrence of the first trigger event. Subsequently, the print queue manager 104 may save the print data corresponding to the identified unprocessed print job in the print device memory to create the print job backup.

Figure 2:
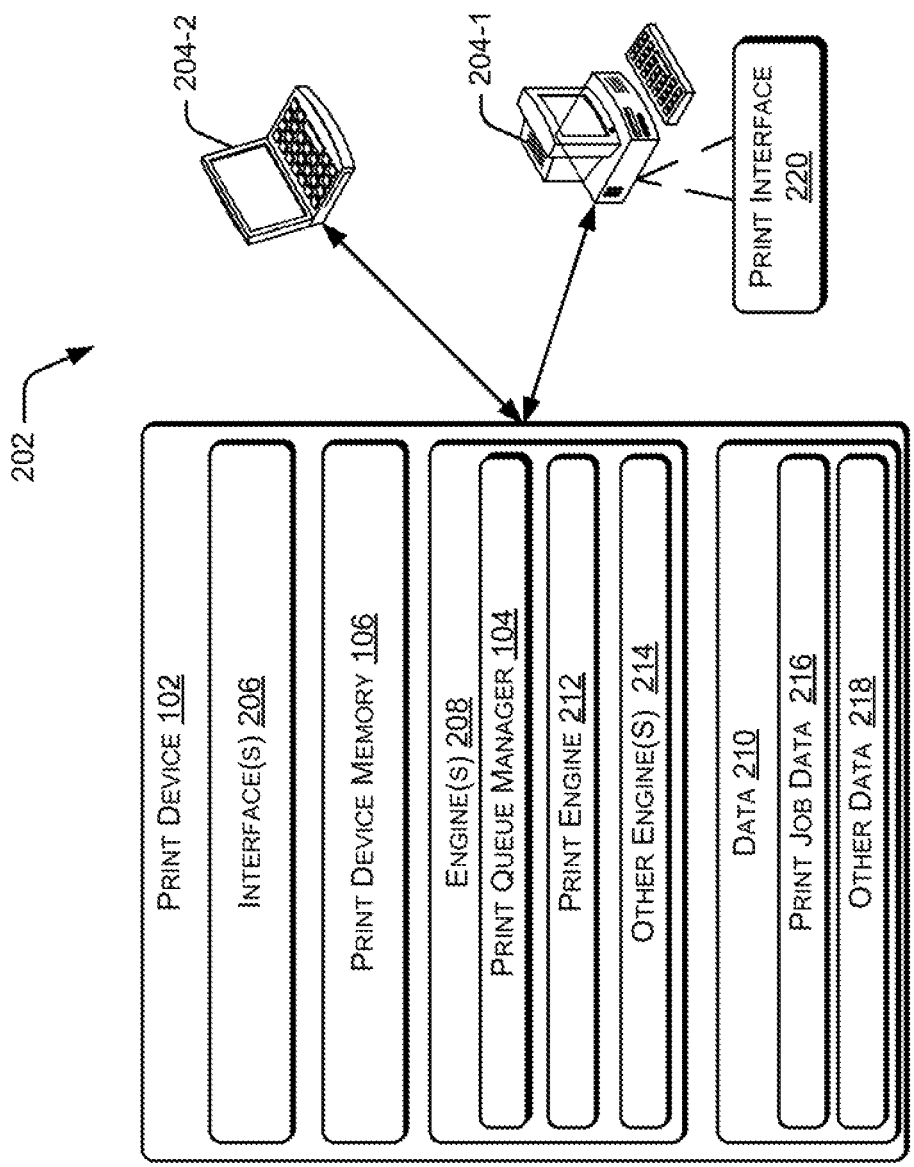
FIG. 2 illustrates a computing environment having a print device, according to an example implementation of the present subject matter.

FIG. 2 illustrates a computing environment 202 having the print device 102, according to an example implementation of the present subject matter. The computing environment 202 includes user devices 204-1 and 204-2 communicatively coupled to the print device 102. An example of the user device(s) 204 includes, but is not limited to, desktop computers, laptops, tablets, portable computers, workstation, mainframe computer, servers, and network servers. The present approaches may also be implemented in other types of user device(s) 204 without deviating from the scope of the present subject matter. Examples of the print device 102 include, but are not limited to, a printer, a multifunction printer, a home printer, and an office printer.

Further, the user devices 204 and the print device 102 may be connected with each other over a communication network (not shown in the figure), allowing the user to provide print instructions to the print device 102 using the user devices 204. The communication network may be a wireless network, a wired network, or a combination thereof. The communication network can also be an individual network or a collection of many such individual networks, interconnected with each other and functioning as a single large network, e.g., the Internet or an intranet. The communication network can be one of the different types of networks, such as intranet, local area network (LAN), wide area network (WAN), and the internet. In an example, the communication network may include any communication network that use any of the commonly used protocols, for example, Hypertext Transfer Protocol (HTTP), and Transmission Control Protocol/Internet Protocol (TCP/IP).

In one example implementation, the print device 102 includes interface(s) 206 and the print device memory 106. The interface(s) 206 may include a variety of interfaces, for example, interfaces for data input and output devices, referred to as I/O devices, storage devices, network devices, and the like. The interface(s) 206 facilitate communication between print device 102, the user devices 204, and various other computing devices connected in a networked environment. The interface(s) 206 may also provide a communication pathway for one or more components of the print device 102. Examples of such components include, but are not limited to, input device, such as keyboards, computer mice, and a touch enabled graphical user interface.

The print device memory 106 may store one or more computer-readable instructions, which may be fetched and executed to provide print interfaces to users for providing print instructions. The memory 106 may include any non-transitory computer-readable medium including, for example, volatile memory such as RAM, or non-volatile memory such as EPROM, flash memory, and the like. The print device 102 further includes engine(s) 208 and data 210.

The engine(s) 208 may be implemented as a combination of hardware and programming (for example, programmable instructions) to implement one or more functionalities of the engine(s) 208. In examples described herein, such combinations of hardware and programming may be implemented in several different ways. For example, the programming for the engine(s) 208 may be processor executable instructions stored on a non-transitory machine-readable storage medium and the hardware for the engine(s) 208 may include a processing resource (for example, one or more processors), to execute such instructions. In the present examples, the machine-readable storage medium may store instructions that, when executed by the processing resource, implement engine(s) 208. In such examples, the print device 102 may include the machine-readable storage medium storing the instructions and the processing resource to execute the instructions, or the machine-readable storage medium may be separate but accessible to the print device 102 and the processing resource. In other examples, engine(s) 208 may be implemented by electronic circuitry.

The data 210 includes data that is either stored or generated as a result of functionalities implemented by any of the engine(s) 208. The engine(s) 208 of the print device 102 include the print queue manager 104, the print engine 212, and other engine(s) 214. The other engine(s) 214 may implement functionalities that supplement applications or functions performed by the engine(s) 208. Further, the data 210 may include print job data 216 and other data 218.

As previously described, the print device 102 selectively creates backup of print jobs in a non-volatile memory, such as the print device memory 106 based on a first trigger event. In one example implementation, the print device 102 may create the print job backup upon receiving a print job deferment input for an unprocessed print job pending in the print queue. In another example implementation, the print device 102 may create the print job backup upon detecting a threshold time exceeded input for an unprocessed print job pending in the print queue. Upon detecting the occurrence of the first trigger event, the print device 102 may create the print job backup for the unprocessed print job identified in the first trigger event.

In operation, the user devices 204 may initially provide a print interface 220 to a user for receiving print instructions for printing print data. The user may access the print interface 220 and provide instructions for printing a digital document having the print data. The print interface 220 may transmit the print data to the print device 102 as a user print request for printing the print data, such as the digital document.

Upon receiving the print request from the user device 204, the print queue manager 104 may create a print job corresponding to the print request. In one example, the print job may indicate print data and print settings, such as page setting and color settings to be used for printing the digital data. The print queue manager 104 may subsequently add the print job to a print queue of the print device 102. The print queue may include a plurality of print jobs sequentially listed in the order of their addition to the print queue. In one example, the print queue and the print jobs may be saved in a print device cache memory. Further, the print data corresponding to each print job may be saved in the print job data 216.

In one example, the print queue manager 104 may continuously monitor the print queue and print each print job in the sequential order of their addition to the print queue. For instance, the print queue manager 104 may provide a first print job at the beginning of the print queue to the print engine 212 for completing the print operation and monitor the completion of the first print job before sending a second print job for printing. The print queue manager 104 may further monitor the print queue to determine occurrence of a first trigger event for creating a print job backup. In one example implementation, the first trigger event may be a print job deferment input. In another example implementation, the first trigger event may be a threshold time exceeded input.

The print job deferment input indicates a user input requesting deferment of an unprocessed print job listed in the print queue. For instance, after providing print instructions for printing a digital document, the user may decide to defer the printing to a later point of time. The user may initially access the print device 102 and select to manage the print queue. The print queue manager 104 may thus provide a user interface to the user for managing the print queue. In on example, the print queue manager 104 may use the interface(s) 206 to provide the user interface. The user may then select the unprocessed print job which the user intends to defer printing to a later point in time to trigger the first trigger event. In one example, the user may access the print queue on the print interface 220 of the user device 204 to trigger the first trigger event.

The print queue manager 104 in turn receives the print job deferment input as the first trigger event indicating the unprocessed print job for which the printing is to be deferred. The print queue manager 104 may subsequently analyze the print job deferment input to identify the unprocessed print job and obtain print data corresponding to the identified unprocessed print job. The print queue manager 104 may obtain the print data from the print device cache memory or the print job data 216. The print queue manager 104 may subsequently save the print data corresponding to the identified unprocessed print job in the print device memory 106 to create the print job backup. In on example, the print queue manager 104 may further delete the identified unprocessed print job from the print queue.

Further, the print queue manager 104 may determine occurrence of a second trigger event to print the identified unprocessed print job saved in the print device memory 106. In one example implementation, for the first trigger event being the print job deferment input, the second trigger event may be user instructions to print the identified unprocessed print job. In another example implementation, for the first trigger event being the threshold time exceeded input, the second trigger event may include completion of print jobs listed before the identified unprocessed print job in the print queue.

For instance, upon deciding to print the digital document corresponding to the deferred print job, the user may access the print device 102 and provide user instructions to print the identified unprocessed print job. In one example, the user may access the print queue on the print interface 220 of the user device 204 to provide the user instructions.

Upon receiving the user inputs as the second trigger event, the print queue manager 104 may process the identified unprocessed print job. The print queue manager 104 may initially obtain the identified unprocessed print job from the print device memory 106. The print queue manager 104 may subsequently add the identified unprocessed print job to the print queue for printing. The print queue manager 104 may further delete the identified unprocessed print job from the print device memory 106. The print engine 212 may then print the identified unprocessed print job.

Further, as previously mentioned, in another example implementation, the first trigger event may be a threshold time exceeded input. The threshold time exceeded input for an unprocessed print job may indicate that a waiting time of the unprocessed print job in the print queue has exceeded a predefined threshold. In one example, the threshold time may be predefined as a default setting of the print device 102. In another example, the threshold time may be preset by the user of the print device 102. To create the print job backup based on the threshold time exceeded input, the print queue manager 104 may monitor the wait time of each unprocessed print job in the print queue. As the wait time exceeds a threshold period, the print queue manager 104 may determine occurrence of the first trigger event, i.e., threshold time exceeded input. The print queue manager 104 may then save the corresponding unprocessed print job in the print device memory 106.

As previously described, the print queue manager 104 may obtain the print data corresponding to the identified unprocessed print job from the print job data 216 and save the print data in the print device memory 106. The print queue manager 104 may subsequently wait for occurrence of the second trigger event. In said example, the second trigger event may include completion of print jobs listed before the identified unprocessed print job in the print queue. On determining occurrence of the second trigger event, the print queue manager 104 may obtain the unprocessed print job from the print device memory 106 for further processing.

The print queue manager 104 may subsequently add the unprocessed print job to the print queue for printing and delete the unprocessed print job from the print device memory 106. The print engine 212 may then print the identified unprocessed print job. The print queue manager 104 may thus assist the user in creating print job backups.

Figure 3:
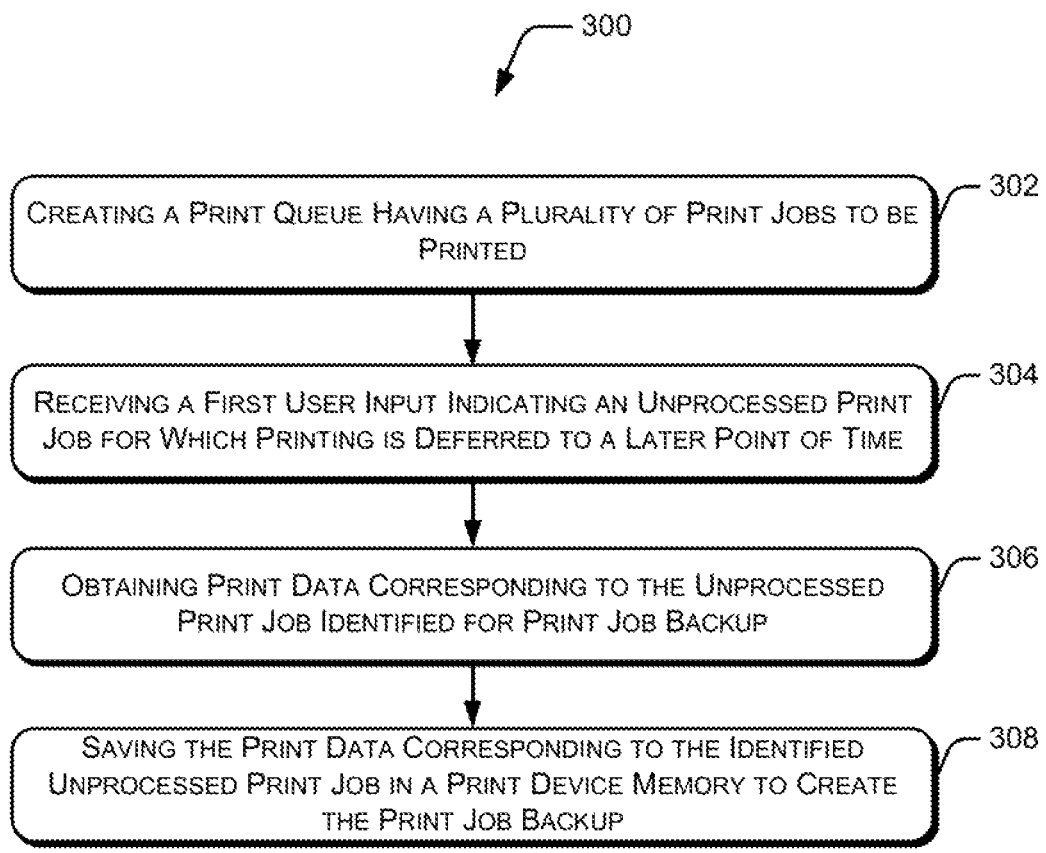
FIG. 3 illustrates a method for creating print job backup, according to an example implementation of the present subject matter.
Figure 4:
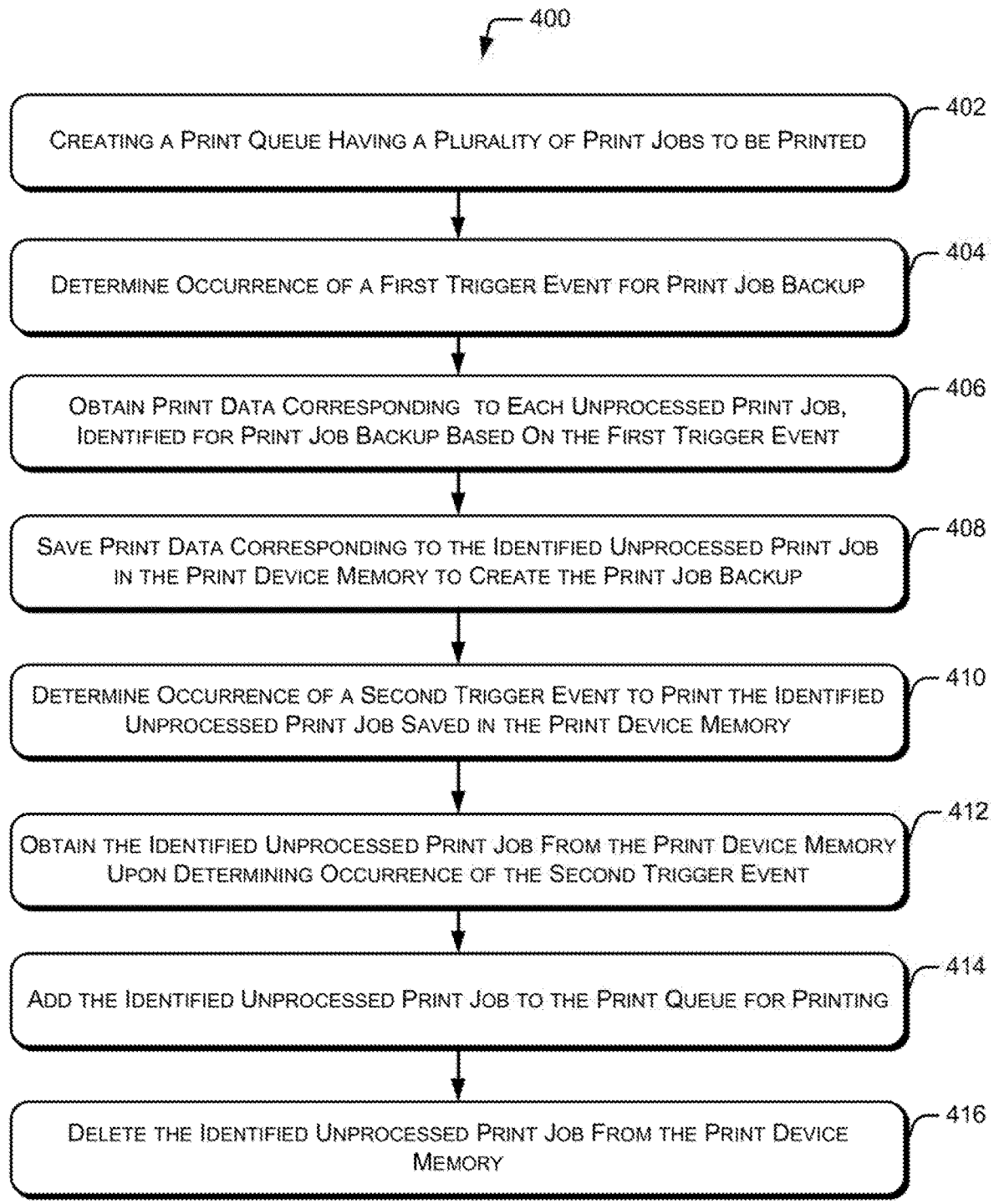
FIG. 4 illustrates a method for creating print job backup, according to another example implementation of the present subject matter.

FIGS. 3-4 illustrate example methods 300 and 400, respectively, for creating print job backup. The order in which the methods are described is not intended to be construed as a limitation, and any number of the described method blocks may be combined in any order to implement the methods, or an alternative method. Furthermore, methods 300 and 400 may be implemented by processing resource or computing device(s) through any suitable hardware, non-transitory machine readable instructions, or combination thereof.

It may also be understood that methods 300 and 400 may be performed by programmed computing devices, such as user devices 64 and print device 102, as depicted in FIGS. 1-2. Furthermore, the methods 300 and 400 may be executed based on instructions stored in a non-transitory computer readable medium, as will be readily understood. The non-transitory computer readable medium may include, for example, digital memories, magnetic storage media, such as one or more magnetic disks and magnetic tapes, hard drives, or optically readable digital data storage media. The methods 300 and 400 are described below with reference to user devices 204 and print device 102 as described above; other suitable systems for the execution of these methods may also be utilized. Additionally, implementation of these methods is not limited to such examples.

At block 302, a print queue having a plurality of print jobs is created. In one example, each print job corresponds to a print request received from a user for printing a digital document. Each print job is to be printed in a sequential order of receipt of the print request. In one example, the print requests are received by a print interface of a user device, for instance, the print interface 220 of the user device 204. Further, the print queue is created by a print queue manager of a print device, for instance, the print queue manager 104 of the print device 102.

At block 304, a first user input is received as a first trigger event. The first user input indicates an unprocessed print job for which printing is to be deferred to a later point of time. In one example, the first user input is provided by a user intending to the defer the printing. The user may provide the first user input on a user interface of the print device.

At block 306, print data corresponding to the unprocessed print job identified for print job backup is obtained. In one example, the print queue manager 104 may obtain the print data from print device cache memory.

At block 308, the print data corresponding to the identified unprocessed print job is saved to create a print job backup. In one example, the print data is saved in a non-volatile memory of the print device, for instance, the print device memory 106 of the print device 102.

FIG. 4 illustrates another method 400 for creating print job backup, according to another example implementation of the present subject matter.

At block 402, a print queue having a plurality of prints jobs is created such that each print job is to be printed in a sequential order. In one example, each print job is printed in the sequential order of receipt of a corresponding print request received from a user for printing a digital document. In one example, the print requests are received by a print interface of a user device, for instance, the print interface 220 of the user device 204. Further, the print queue is created by a print queue manager of a print device, for instance, the print queue manager 104 of the print device 102.

At block 404, occurrence of a first trigger event for creating a print job backup is determined. In one example implementation, the first trigger event may be a print job deferment input. In another example implementation, the first trigger event may be a threshold time exceeded input. In one example, occurrence of the first trigger event is detected by the print queue manager 104.

At block 406, print data corresponding to the unprocessed print job identified for print job backup, based on the first trigger event, is obtained. In one example, the print queue manager 104 may obtain the print data from print device cache memory or the print job data 216.

At block 408, the print data corresponding to the identified unprocessed print job is saved to create a print job backup. In one example, the print data is saved in a non-volatile memory of the print device, for instance, the print device memory 106 of the print device 102.

At block 410, occurrence of a second trigger event is determined. In one example, the second trigger event is to print the identified unprocessed print job saved in the print device memory. In one example, the second trigger event may be completion of print jobs listed before the identified unprocessed print job in the print queue. In another example, the second trigger may be user instructions to print the identified unprocessed print job. In one example, the print queue manager 104 may determine the occurrence of the second trigger event.

At block 412, the identified unprocessed print job is obtained upon determining occurrence of the second trigger event. In one example, the print data corresponding to the identified unprocessed print job is obtained from the print device memory for further processing by the print queue manager 104.

At block 414, the identified unprocessed print job is added to the print queue for printing. In one example, print queue manager 104 adds the identified unprocessed print job to the print queue.

At block 416, the identified unprocessed print job is deleted from the print device memory. In one example, print queue manager 104 deletes the identified unprocessed print job from the print device memory after adding the identified unprocessed print job to the print queue.

Figure 5:
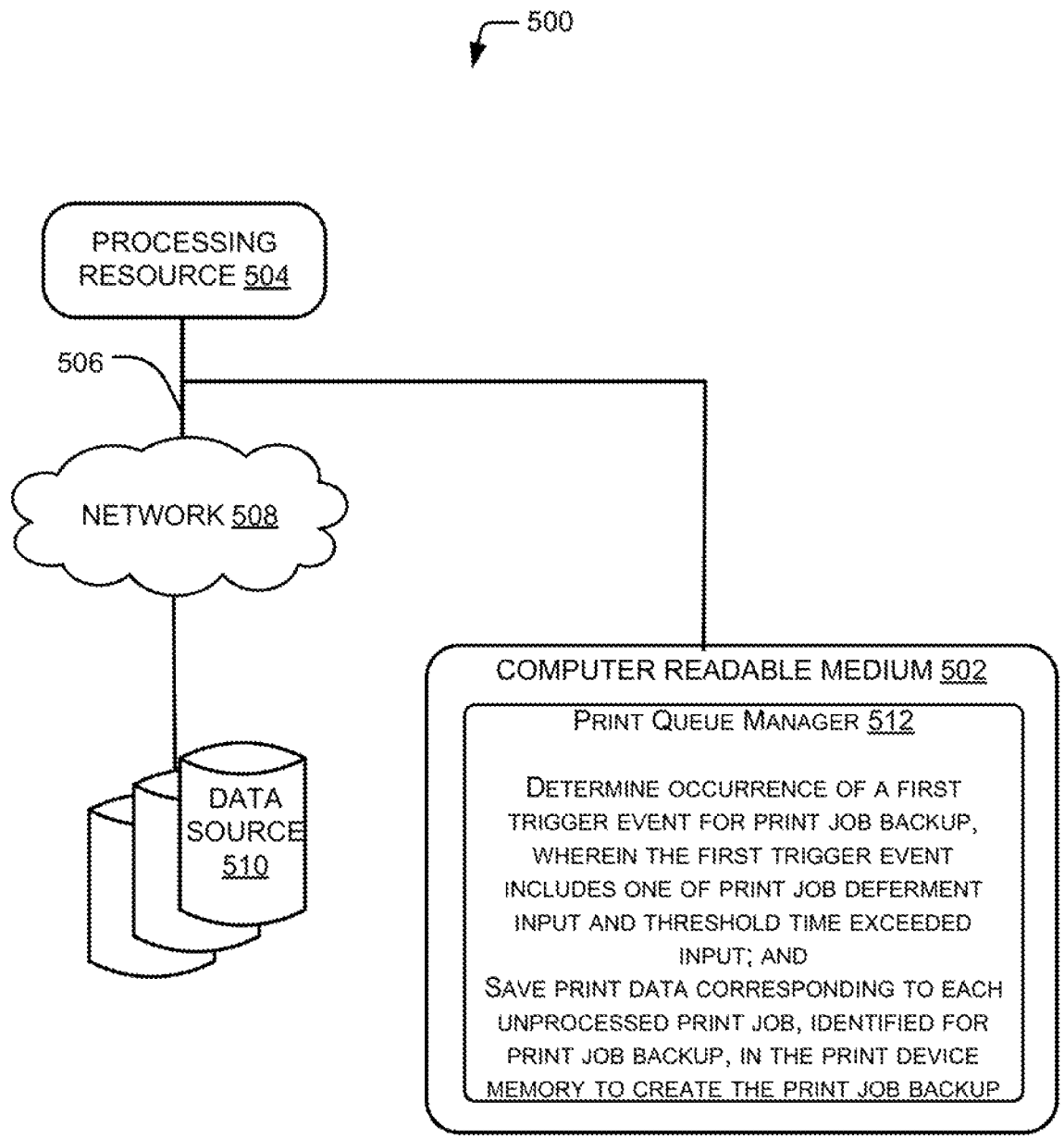
FIG. 5 illustrates a network environment having a non-transitory computer readable medium for creating print job backup, according to an example implementation of the present subject matter.

FIG. 5 illustrates an example network environment 500 using a non-transitory computer readable medium 502 for creating print job backup, according to an example implementation of the present subject matter. The network environment 500 may be a public networking environment or a private networking environment. In one example, the network environment 500 includes a processing resource 504 communicatively coupled to the non-transitory computer readable medium 502 through a communication link 506.

For example, the processing resource 504 can be a processor of a computing system, such as the system 100. The non-transitory computer readable medium 502 can be, for example, an internal memory device or an external memory device. In one example, the communication link 506 may be a direct communication link, such as one formed through a memory read/write interface. In another example, the communication link 506 may be an indirect communication link, such as one formed through a network interface. In such a case, the processing resource 504 can access the non-transitory computer readable medium 502 through a network 508. The network 508 may be a single network or a combination of multiple networks and may use a variety of communication protocols.

The processing resource 504 and the non-transitory computer readable medium 502 may also be communicatively coupled to data sources 510 over the network 508. The data sources 510 can include, for example, databases and computing devices. The data sources 510 may be used by the database administrators and other users to communicate with the processing resource 504.

In one example, the non-transitory computer readable medium 502 includes a set of computer readable instructions such as a print queue manager 512. As would be understood, the print queue manager 512 implements the functionality of the print queue manager 104. The set of computer readable instructions, referred to as instructions hereinafter, can be accessed by the processing resource 504 through the communication link 506 and subsequently executed to perform acts for facilitating facsimile communication.

For discussion purposes, the execution of the instructions by the processing resource 504 has been described with reference to various components introduced earlier with reference to the description of FIGS. 1-2.

On execution by the processing resource 504, the print queue manager 512, may add a print job to a print queue having a plurality of print jobs to be printed in a sequential order. In one example, the print job corresponds to a print request received from a user for printing a digital document. The print queue manager 512 may then determine if a first trigger event for print job backup has occurred. The first trigger event includes one of a print job deferment input and a threshold time exceeded input. The print queue manager 512 may subsequently obtain print data corresponding to each unprocessed print job, identified for print job backup based on the first trigger event and save the print data in the print device memory to create the print job backup. Further, upon determining occurrence of a second trigger event to print the identified unprocessed print job saved in the print device memory, the print queue manager 512 may print the identified unprocessed print job.

Although examples for the present subject matter have been described in language specific to structural features and/or methods, it should be understood that the appended claims are not limited to the specific features or methods described. Rather, the specific features and methods are disclosed and explained as examples of the present subject matter.

What is claimed is:

1. A print device comprising:
a processor;
print device memory;
a print queue manager coupled to the processor to:
   add a print job to a print queue having a plurality of print jobs to be printed, wherein the print job corresponds to a print request received from a user for printing a digital document;
   determine occurrence of a first trigger event for creating a print job backup, wherein the first trigger event includes a print job deferment input;
   obtain print data corresponding to an unprocessed print job identified for print job backup based on the occurrence of the first trigger event; and
   save the print data corresponding to the identified unprocessed print job in the print device memory to create the print job backup.

2. The print device as claimed in claim 1, wherein the print queue manager further is to:
   provide a user interface to a user for managing the print queue; and
   receive the print job deferment input as the first trigger event, indicating the unprocessed print job for which printing is to be deferred to a later point of time.

3. The print device as claimed in claim 1, wherein the print queue manager further is to:
   receive user instructions to print the identified unprocessed print job;
   obtain the identified unprocessed print job from the print device memory;
   add the identified unprocessed print job to the print queue for printing; and
   delete the identified unprocessed print job from the print device memory.

4. The print device as claimed in claim 1, further comprising a print engine to print each of the plurality of print jobs from the print queue.

5. The print device as claimed in claim 1, wherein the print queue manager further is to:
   monitor a wait time of each unprocessed print job from the plurality of print jobs in the print queue; and
   for the wait time exceeding a threshold period for an unprocessed print job, determine occurrence of the first trigger event.

6. A method for creating q print job backup, the method comprises:
   creating a print queue having a plurality of print jobs to be printed, wherein each print job corresponds to a print request received from a user for printing a digital document;
   receiving, as a first trigger event for creating the print job backup, a first user input indicating an unprocessed print job for which printing is to be deferred to a later point of time;
   obtaining print data corresponding to the unprocessed print job identified for the print job backup; and
   saving the print data corresponding to the identified unprocessed print job in a print device memory to create the print job backup.

7. The method as claimed in claim 6, further comprising:
   receiving the print request for printing the digital document having print data;
   creating a print job corresponding to the print request; and
   adding the print job to the print queue.

8. The method as claimed in claim 6, further comprising:
   receiving, as a second trigger input, user instructions to print the identified unprocessed print job;
   processing the identified unprocessed print job; and
   printing the identified unprocessed print job.

9. The method as claimed in claim 8, wherein processing the identified unprocessed print job further comprises:
   obtaining the identified unprocessed print job from the print device memory;
   adding the identified unprocessed print job to the print queue for printing; and
   deleting the identified unprocessed print job from the print device memory.

10. The method as claimed in claim 6, further comprising:
   monitoring a wait time of each unprocessed print job in the print queue;
   for the wait time exceeding a threshold period, saving q corresponding unprocessed print job in the print device memory;
   obtaining the unprocessed print job from the print device memory upon completion of print jobs listed before the unprocessed print job in the print queue;
   adding the unprocessed print job to the print queue for printing; and
   deleting the unprocessed print job from the print device memory.

11. A non-transitory computer readable medium having a set of computer readable instructions that, when executed, cause a processor to:
   add a print job to a print queue having a plurality of print jobs to be printed, wherein the print job corresponds to a print request received from a user for printing a digital document;
   determine occurrence of a first trigger event for a print job backup, wherein the first trigger event includes one of print job deferment input and threshold time exceeded input;
   save print data corresponding to each unprocessed print job, identified for the print job backup based on the fir trigger event, in a print device memory to create the print job backup;
   determine occurrence of a second trigger event to print the identified unprocessed print job saved in the print device memory; and
   print the identified unprocessed print job.

12. The non-transitory computer readable medium as claimed in claim 11, wherein the computer readable instructions, when executed, further cause the processor to obtain the saved print data corresponding to the identified unprocessed print job.

13. The non-transitory computer readable medium as claimed in claim 11, wherein the computer readable instructions, when executed, further cause the processor to:
    obtain the identified unprocessed print job from the print device memory upon determining occurrence of the second trigger event; and
    add the identified unprocessed print job to the print queue for printing; and
    delete the identified unprocessed print job from the print device memory.

14. The non-transitory computer readable medium as claimed in claim 13, wherein the second trigger event is one of:
    completion of print jobs listed before the identified unprocessed print job in the print queue; and
    user instructions to print the identified unprocessed print job.

15. The non-transitory computer readable medium as claimed in claim 13, wherein the computer readable instructions, when executed, further cause the processor to monitor the print queue and print each print job in sequential order of their addition to the print queue.

* * * * *